United States Patent Office
3,028,418
Patented Apr. 3, 1962

3,028,418
TREATMENT OF CYCLIC TERPENES
Robert L. Webb, Jacksonville, Fla., assignor to The Glidden Company, Cleveland, Ohio, a corporation of Ohio
No Drawing. Filed Sept. 7, 1955, Ser. No. 533,020
14 Claims. (Cl. 260—489)

The present invention relates to the treatment of cyclic terpenes having a single cyclic double bond, and particularly relates to a treatment of such terpenes of the p-menthane and pinane series in which the cyclic double bond involves the carbon atom carrying the methyl group, whereby there are produced intermediates useful in the preparation of menthol and other p-menthane derivatives possessing an oxygenated substituent at the 3-position.

The compounds contemplated as the starting materials for use in the present invention are such compounds as α-pinene, limonene, carvomenthene, α-terpineol, ethers of α-terpineol, such as the methyl ether, and the like. α-Pinene and dl-limonene, commonly known as dipentene, are available in large quantities from turpentine. Also substantial quantities of dipentene and α-terpineol are obtained in the commercial production of pine-oil from turpentine. Carvomenthene is readily produced by the partial hydrogenation of limonene since the exocyclic double bond is preferentially hydrogenated. Limonene is also now available in substantial quantities from the citrus fruit industry.

The conversion of these readily available terpene compounds to the more valuable menthols and related materials is highly desirable, and it is accordingly an object of the present invention to provide a process for treating such terpene compounds so as to convert them into derivatives useful in the preparation of compounds of the p-menthane series having an oxygenated substituent in the 3-position.

Another object of the invention is to produce intermediates useful for the preparation of menthol and related compounds.

An additional object is to provide a process for converting certain readily available terpenic materials into more valuable terpenic compounds possessing valuable odor and taste qualities.

A further object is to provide a novel process for introducing an oxygenated substituent into certain unsaturated terpene compounds.

Other objects will be apparent to those skilled in the art from the following description of the invention.

It has been found that the foregoing objects can be accomplished by first treating the unsaturated compounds of the pinane and p-menthane series possessing a carbon-carbon double bond involving the carbon atom carrying the methyl group, which double bond is the sole cyclic double bond, to chlorination in the presence of an alcohol and preferably in the presence of a base, whereby the elements of R—O—Cl are added to the double bond. In the reaction the R—O— radical adds to the trialkylated carbon atoms, and —Cl adds to the dialkylated carbon atom involved in the double bond. Specifically, the chloroalkoxylation of carvomenthene yields both the α- and β-forms of 1-methoxy-2-chloro-p-menthane, which are cis-trans forms, although assignment of exact structural configuration is not offered. Limonene yields the corresponding 8-menthene compound. Where two forms of the same compound are produced, we refer to the lower boiling as the alpha-form and to the higher boiling as the beta-form.

The chloroalkoxy compounds are readily dehydrochlorinated by heating in the presence of alkali or other dehydro-chlorinating agent with the formation of an allylic ether, which, when derived from carvomenthene, is 1-alkoxy-2-menthene, and when derived from α-pinene is 2-alkoxy-3-pinene.

Treatment of the ethers of the tertiary allylic alcohols with formic acid or other carboxylic acid readily yields the corresponding carboxylic acid ester of the isomeric allylic secondary alcohol, which in the case of the 1-alkoxy-2-menthene and formic acid is piperityl formate, and in the case of 2-alkoxy-3-pinene and formic acid is verbenyl formate. In the case of the piperityl esters, hydrolysis and hydrogenation, in either order, yield menthol.

The verbenyl ester, after hydrolysis, can be thermally isomerized as disclosed in the copending application Serial No. 348,825, filed April 14, 1953, now Patent 2,972,632, to yield isopiperitenol, which on hydrogenation yields menthol.

Similar considerations apply in the case of the overall process as applied to limonene, α-terpineol, etc. Thus, treatment of the tertiary allylic ether obtained from limonene with formic acid yields isopiperitenyl formate. In the case of α-terpineol, the 8-OH group can be readily removed by dehydration at any stage of the processing, as this dehydration is quite readily accomplished. Conveniently it can be accomplished during the hydrogenation step by proper choice of conditions and catalyst, such, for example, as disclosed in Simonsen, The Terpenes, 2nd ed., vol. 1, page 262.

The reactions involved, using formic acid, are illustrated in the following equations for (a) carvomenthene as the starting material and (b) α-pinene as the starting material:

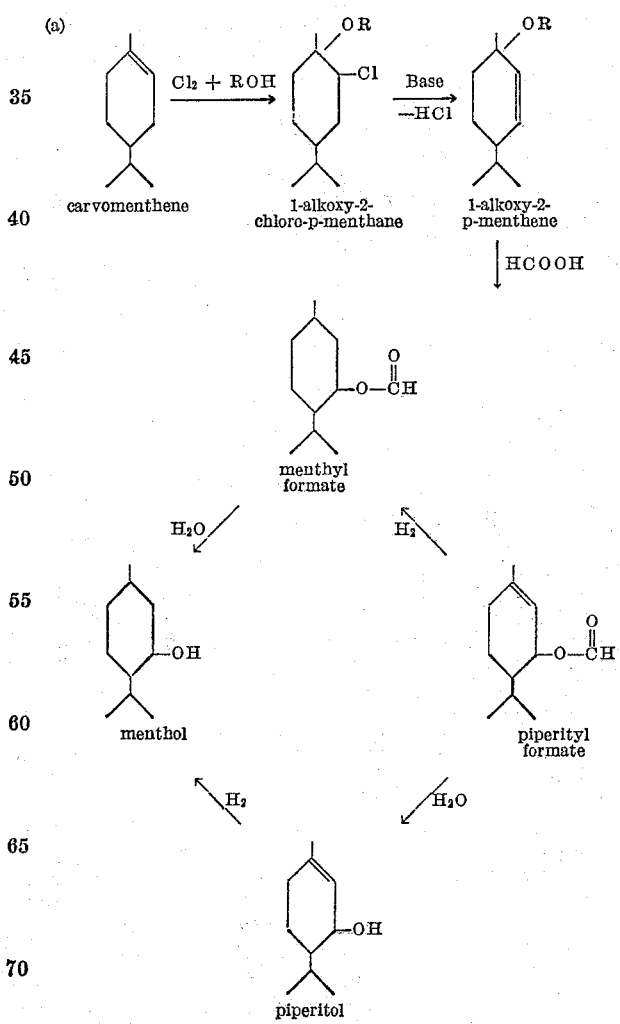

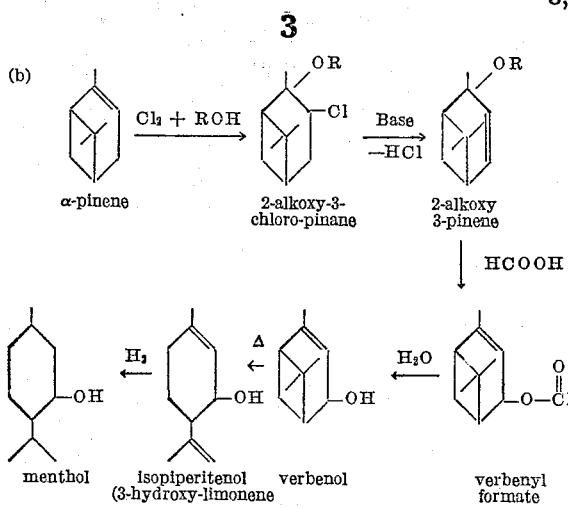

Since racemization does not occur in any of the reactions involved, one can, by the proper choice of optically active starting material and the selection of the proper intermediate, produce a menthol having the desired configuration. For example, hydrogenation of the cis-form of piperitol produced from di-limonene leads predominately to di-neomenthol, and hydrogenation of the trans-form of the piperitol derived from l-limonene leads predominately to di-isomenthol. Thus, it is seen that when the substituents at the 3- and 4-positions of the p-methane derivative are trans, the hydrogenation is such that the l-methyl group is directed predominately cis to the isopropyl group, and that when the substituents at 3- and 4- are cis, the position of the l-methyl group on hydrogenation is predominately trans to the isopropyl group.

The configuration at the 1-position now having been fixed, the neo- or the isomenthol can be subjected to one of the known equilibration treatments to form an equilibrium mixture of the isomeric menthols of the menthol family in which l-menthol predominates and which is separable from the mixture by fractional distillation. If the starting hydrocarbon is di-limonene, then the cis-piperitol will yield l-menthol when processed as above, and the trans-piperitol will yield d-menthol.

The following examples are illustrative:

EXAMPLE 1

15,000 grams of d-limonene, B.P. at 100 mm., 110° C., $N_D^{25}$ 1.4710, $D_4^{25}$ 0.840, $\alpha_D^{25}$ (10 cm.) = +97.6, was hydrogenated in the presence of 0.2% by weight of 5.0% Pd on carbon at 35–70° C. under a hydrogen pressure of 50–100 p.s.i.g. When one mole of hydrogen had been added, the hydrogenation was stopped and the product was filtered to remove catalyst. A small portion of the hydrogenation product was fractionated through an efficient column at 100 mm. pressure. Comparison of infra-red spectra of the fractions with the spectra of known compounds indicated that the hydrogenation product was 82–84% d-carvomenthene, B.P. at 100 mm., 110° C., $N_D^{25}$ 1.4594, $D_4^{25}$ 0.825, $\alpha_D^{25}$ (10 cm.) +80, 8–10% p-menthane, 5% cymene and 1–2% unchanged d-limonene.

EXAMPLE 2

1000 grams of the filtered hydrogenation product from Example 1, 82–84% d-carvomenthene, 3000 grams of methanol and 630 grams of $NaHCO_3$ were stirred at 15–20° C. while 425 grams of chlorine was bubbled into the mixture. An ice bath was required to hold the temperature below 20° C.

The reaction product was then diluted with 5000 ml. of water. The oil was separated and dried to yield 1270 grams of chlorination product. A portion of the chlorination product was fractionated through an efficient glass packed column at 10 mm. pressure. Infrared spectroanalysis of the fractions indicated that the chlorination product was 10–12% hydrocarbons, B.P. at 10 mm., 52–60° C.; 20–22% 6-chloro-1-p-menthene, B.P. at 10 mm., 95° C. to 97° C.; 6–8% 6-methoxy-1-menthene, B.P. at 10 mm., 86° C., $N_D^{25}$ 1.4533, $D_4^{25}$ 0.8811, $\alpha_D^{25}$ (10 cm.) —12.02°; 24–26% α-1-methoxy-2-chloro-p-menthane, B.P. at 10 mm. 104° C., $N_D^{25}$ 1.4680, $D_4^{25}$ 0.9976, $\alpha_D^{25}$ (10 cm.) +45.0°; 24–26% β-1-methoxy-2-chloro-p-menthane, B.P. at 10 mm., 113–118° C., $N_D^{25}$ 1.4746, $D_4^{25}$ 1.0078, $\alpha_D^{25}$ (10 cm.) —2.3°; 10–12% high boiling materials, mostly dichlorides.

Identification of Products

Comparison of infrared spectra with the spectra of known compounds indicated that the hydrocarbon fraction was a mixture of cymene and p-menthane containing a trace of 1-p-menthene.

The chloride fraction boiling at 95–97° C. was hydrolyzed by stirring it with lime and water at 95–100° C. for 12 hours. Comparison of the infrared spectrum of the hydrolyzed oil with a known spectrum of 1-p-menthene-6-ol, carvotanacetol, showed them to be the same. Thus, the chloride must have been 2-chloro-6-p-menthene.

Infrared spectroanalysis of the fraction boiling at 86° C. at 10 mm. pressure indicated that it was an unsaturated ether as shown by the presence of the characteristic trisubstituted ethylenic band absorption at 12.3μ and the presence of the characteristic ether absorption at 9.2μ. When 2-chloro-6-p-menthene is treated with 10% KOH in methanol, 6-methoxy-1-menthene is produced. The comparison of infrared spectra showed that the ether fraction present in the chlorination product was 6-methoxy-1-menthene.

Infrared spectroanalysis of the fraction boiling at 104–118° C. at 10 mm. pressure indicated that the compounds contained both chloro and ether groups as shown by the presence of characteristic chloro and ether group absorptions at 13.2μ to 13.8μ and 9.2μ, respectively. Dehydrochlorination of the chloro ether using KOH and diethylene glycol at 200° C. gave an unsaturated ether containing a symmetrically disubstituted ethylenic bond as shown by the presence of the characteristic symmetrically disubstituted ethylenic bond absorption at 13.7μ in the infrared spectrum. In the absence of any unlikely rearrangements, the double bond of the unsaturated ether must be between carbon atoms 2 and 3. Thus, the chloro group of the chloro ether must have been on either carbon atom 2 or 3. The above data indicate that if the chloro ether is formed by adding $CH_3OCl$ to the double bond of 1-p-menthene, the chloro group must be attached to carbon atom 2 and the $CH_3O$ group must be attached to carbon atom 1 giving 1-methoxy-2-chloro-p-menthane. No investigation was made to determine the stereochemistry of the chloro ether other than the observation that two stereoisomers were present.

EXAMPLE 3

1000 grams of the filtered hydrogenation product from Example 1 and 3000 grams of methanol were stirred while 425 grams of chlorine was bubbled into the mixture. The temperature was maintained at 15–20° C. by using an ice bath. The reaction product was then diluted with 5000 ml. of water. The oil layer was separated and dried to yield 1257 grams of chlorination product. The chlorination product was fractionated through an efficient glass packed column at 10 mm. pressure. Infrared spectroanalysis of the fractions indicated that the chlorination product was 10–12% hydrocarbons, 8–10% 6-methoxy-1-p-menthene, 30–32% 6-chloro-1-p-menthene, 18–20% α-1-methoxy-2-chloro-p-menthane, 18–20% β-1-methoxy-2-chloro-p-menthane, and 15–20% high boiling chlorides.

EXAMPLE 4

1000 grams of the filtered hydrogenation product from Example 1, 3000 grams of methanol and 630 grams of $NaHCO_3$ were stirred while 425 grams of chlorine was added. The reaction was held at 50–55° C. by using an ice bath. The reaction product was diluted with water and dried as shown in Examples 2 and 3. 1310 grams of dried chlorination product was obtained. Fractionation followed by infrared spectroanalysis of the fractions indicated that the chlorination product was 12–15% hydrocarbons, 24–26% 6-methoxy-1-p-menthene, 2–4% 6-chloro-1-p-menthene, 24–26% α-1-methoxy-2-chloro-p-menthane, 24–26% β-1-methoxy-2-chloro-p-menthane, 8–10% high boiling chlorides.

EXAMPLE 5

1000 grams of d-limonene, $\alpha_D^{25}$ (10 cm.) +97.6°, 3000 grams of methanol and 617 grams of $NaHCO_3$ were stirred at 15–20° C. while 528 grams of chlorine was bubbled into the mixture. An ice bath was required to keep the temperature below 20° C. The reaction product was diluted with 5000 ml. of water. The oil layer was separated and dried to yield 1290 grams of chlorination product. Fractionation followed by infrared spectroanalysis of the fractions indicated that the chlorination product was 10–15% hydrocarbons, 20–25% 6-chloro-1,8-p-menthadiene, B.P., 10 mm., 95–97° C., 5–10% 6-methoxy-1,8-p-menthadiene, B.P., 10 mm., 87–88° C., 50–52% 1-methoxy-2-chloro-8-p-menthene, B.P., 10 mm., 120° C., and 5–10% high boiling chlorides.

Identification of Compounds

Comparison of the infrared spectrum of the hydrocarbon fraction with the spectra of known compounds indicated that this fraction was a mixture of cymene and unchanged limonene.

6-chloro-1,8-p-menthadiene was identified as such by hydrolyzing it to carveol by stirring it with $Ca(OH)_2$ and water at 100° C. for 12 hours.

When 6-methoxy-1,8-p-menthadiene and 1-methoxy-2-chloro-8-p-menthene are catalytically hydrogenated in the presence of 0.5% by weight of $PtO_2$ at 25–30° C. and under a hydrogen pressure of 40–60 p.s.i.g., 6-methoxy-1-p-menthene and 1-methoxy-2-chloro-p-menthane are formed, as shown by comparison of the infrared spectra with the spectra of the compounds identified in Example 2.

EXAMPLE 6

1000 grams of α-pinene, 3000 grams of methanol and 617 grams of $NaHCO_3$ were stirred at 15–20° C. while 528 grams of chlorine was bubbled into the mixture. The reaction product was diluted with 5000 grams of water. The oil layer was separated and dried to yield 1275 grams of chlorination product. Fractionation followed by infrared spectroanalysis indicated that the chlorination product was 10–15% hydrocarbon, 20–25% pinocarvyl chloride, B.P., 10 mm., 80–85° C., 5–10% unsaturated ethers, B.P., 10 mm., 72–78° C., mixture of pinocarvylmethyl ether and myrtenyl methyl ether, 40–45% 2-methoxy-3-chloropinane, B.P., 10 mm., 100–110° C. and 10–15% high boiling chlorides.

Identification of Compounds

Infrared spectroanalysis of the hydrocarbon fraction indicated that it was predominately α-pinene.

Infrared spectronanalysis of the fraction boiling at 80–85° C. at 10 mm. indicated that it contained a disubstituted terminal methylene as well as a chloro group, as shown by the presence of the characteristic disubstituted terminal methylene and chloro absorptions in the spectrum at 11.3μ and 13.2–13.8μ, respectively.

Infrared spectroanalysis, after hydrolysis of this chloride by stirring it with $Ca(OH)_2$ and water at 100° C., showed a decrease in the terminal methylene absorption. Comparison of the spectrum of the hydrolisate with the spectra of known compounds showed that the hydrolisate was a mixture of pinocarveol and myrtenol. The above data indicate that the fraction boiling at 80–85° C. at 10 mm. was pinocarvyl chloride containing possibly a small amount of myrtenyl chloride.

Infrared spectroanalysis of the fraction boiling at 72–78° at 10 mm. indicated that it was a mixture of unsaturated ethers containing a disubstituted terminal methylene group and a trisubstituted ethylenic bond, as shown by the presence of the characteristic disubstituted terminal methylene group and the trisubstituted ethylenic bond absorption in the spectrum at 11.3μ and 12.3μ, respectively. Treatment of a sample of pinocarvyl chloride (the fraction boiling at 80–85° C. at 10 mm.) with 10% KOH in methanol gave a material having an infrared spectrum identical with the unsaturated ethers obtained from fractionation of the chlorination product. It is known that the treatment of pinocarvyl chloride with methanolic KOH yields a mixture of pinocarvyl methyl ether and myrtenyl methyl ether. From the above data, it is evident that the fraction boiling at 72–78° C. at 10 mm. is a mixture of pinocarvyl methyl ether and myrtenyl methyl ether.

Infrared spectroanalysis of the fraction boiling at 100–110° C. at 10 mm. pressure indicated that the compound contained both ether and chloro groups, as shown by the presence of the characteristic ether and chloro group absorptions in the spectrum at 9.2μ and 13.2–13.8μ, respectively. Dehydrochlorination of a sample of the chloro ether compound using KOH and diethylene glycol at 195–205° C. gave an unsaturated ether containing a symmetrically disubstituted ethylenic bond, as shown by the presence of the characteristic disubstituted ethylenic bond absorption in the infrared spectrum at 13.7μ. In the absence of any unlikely rearrangement of the pinane skeleton, the double bond must be between carbon atoms 3 and 4. Thus, if $CH_3OCl$ was added to the double bond of α-pinene during the chlorination, the chloro group must be attached to carbon atom number 3 and the methoxyl group attached to carbon atom number 2. From the above data, it is evident that the fraction boiling between 100–110° C. at 10 mm. pressure is 2-methoxy-3-chloro-pinane and that the dehydrochlorination product is 2-methoxy-3-pinene. See also Example 21 for conversion of the latter compound to verbenol.

EXAMPLE 7

500 grams of α-terpineol, 1500 grams of methanol, 340 grams of $NaHCO_3$ were stirred, while 230 grams of chlorine was bubbled into the mixture at 15–20° C. The reaction product was washed with 2500 ml. of $H_2O$ and dried to yield 672 grams of chlorination product. The chlorination product was fractionated through an efficient glass packed column at 1.0 mm. pressure. Infrared spectroanalysis of the fractions indicated that the chlorination product was 5–10% hydrocarbons, 3–5% unchanged α-terpineol, 5–10% 6-methoxy-1-p-menthene-8-ol, B.P., 1.0 mm., 73–77° C., 15–20% 6-chloro-1-p-menthene-8-ol, B.P., 1.0 mm., 80–87° C., 55–60% 1-methoxy-2-chloro-p-menthane-8-ol and 5–10% unidentified high boiling compounds.

Identification of Compounds

Comparison of the spectrum of the hydrocarbon fraction with the spectra of known compounds showed that it was a mixture of cymene and monocyclic terpenes (limonene, terpinolene, terpinenes).

The fraction boiling at 73–77° C. at 1.0 mm. was a hydroxy ether, as shown by the presence of the characteristic hydroxyl and ether absorptions in its infrared spectrum at 3.0μ and 9.2μ, respectively. Dehydration of the compound by heating it to 173° C. in the presence of a trace of iodine gave 6-methoxy-2,8-p-menthadiene (carvyl methyl ether), as shown by infrared spectroanalysis. The fraction boiling at 73–77° C. at 1.0 mm. pressure, therefore, was 6-methoxy-1-p-menthene-8-ol.

The fraction boiling at 80–87° C. at 1.0 mm. was identified as a hydroxy chloride, as shown by the presence of the characteristic hydroxyl and chloride absorptions in its infrared spectrum at 3.0μ and 9.2μ, respectively. Treatment of the hydroxy chloride with a solution of 10%

KOH in methanol gave 6-methoxy-1-p-menthene-8-ol, as shown by infrared spectroanalysis. It was identical with the product so identified above through dehydration to carvyl methyl ether.

Infrared spectroanalysis of the residue indicated that it was predominately a single compound. The compound contained a hydroxyl group, a chloro group and an ether group, as shown by the presence of the characteristic hydroxyl, chloro and ether absorptions in the spectrum at $3.0\mu$, $13.2$–$13.8\mu$ and $9.2\mu$, respectively. The $CH_3OCl$ adds to the double bond of $\alpha$-terpineol as it added to carvomenthene, $\alpha$-pinene and limonene. The compound present in the residue is 1-methoxy-2-chloro-p-menthane-8-ol, therefore.

EXAMPLE 8

500 grams of the filtered hydrogenation product from Example 1, 2160 grams of ethanol and 315 grams of $NaHCO_3$ were stirred at 15–20° C., while 212 grams of chlorine was bubbled into the mixture. An ice bath was required to hold the temperature below 20° C. The reaction product was then diluted with water. The oil layer was isolated and dried to yield 620 grams of chlorination product. Infrared spectroanalysis of the chlorination product indicated that it contained 20–25% 1-ethoxy-2-chloro-p-menthane.

EXAMPLE 9

500 grams of the filtered hydrogenation product from Example 1 (82–84% d-carvomenthene), 2800 grams isopropanol and 315 grams of $NaHCO_3$ were stirred at 15–20° C., while 212 grams of chlorine was bubbled into the mixture. The reaction product was then washed with water. The oil layer was isolated and dried under vacuum to yield 615 grams of chlorination product. Infrared spectroanalysis of the chlorination product showed that it contained 5–10% of the tertiary chloro ether.

EXAMPLE 10

300 grams of a mixture of the $\alpha$ and $\beta$ forms of 1-methoxy-2-chloro-p-menthane from Example 2, 150 grams of KOH and 150 grams of diethylene glycol were stirred for 3 hours at 195–205° C. at atmospheric pressure. The reaction product was then distilled off to a pot temperature of 230° C. 215 grams of distillate was obtained. Fractionation of the distillate, followed by infrared spectroanalysis of the fractions, indicated that it consisted of 12% hydrocarbons, B.P., 10 mm., 52–58° C., 60–65% $\alpha$-1-methoxy-2-p-menthene, B.P., 10 mm., 76.5° C., $N_D^{25}$ 1.4540, $D_4^{25}$ 0.8758, $\alpha_D^{25}$, 10 cm., $-2.45°$, 15–20% $\beta$-1-methoxy-2-p-menthene, B.P., 10 mm., 80° C., $N_D^{25}$ 1.4553, $D_4^{25}$ 0.8799, $\alpha_D^{25}$, 10 cm., $+15.3°$, and 3–5% unchanged 1-methoxy-2-chloro-p-menthane.

Identification of Compounds

Infrared spectroanalysis of the hydrocarbon fraction indicated that it was largely p-cymene containing small amounts of $\alpha$-terpinene and phellandrenes.

Infrared spectroanalysis of the fractions boiling at 76.5° C. and 80° C. at 10 mm. indicated that they were unsaturated ethers containing a symmetrically disubstituted ethylenic bond as shown by the presence of the characteristic ether and symmetrically disubstituted ethylenic bond absorptions at $9.2\mu$ and $13.7\mu$, respectively. Thus, the double bond of the unsaturated ethers must be in the 2–3 position. Oxidation of the individual unsaturated ethers with $Na_2Cr_2O_7$ and aqueous $H_2SO_4$, Beckmann mixture, gave d-piperitone, $B.P._{10}$, 102–103° C., $\alpha_D^{25}$, 10 cm., $+41°$. From the above data, it is evident that the ethers are stereoisomers of 1-methoxy-2-p-menthene, each of which is capable of yielding d-piperitone.

EXAMPLE 11

200 grams of a mixture of the $\alpha$ and $\beta$ forms of 1-methoxy-2-chloro-p-menthane and 100 grams of KOH were stirred for 8 hours at 195–205° C. The reaction product was distilled from the reaction flask to a pot temperature of 230° C. 165 grams of distillate was recovered. Infrared spectroanalysis of the distillate indicated that it was 15–20% cymene, 50–55% 1-methoxy-2-p-menthene, mixture of $\alpha$ and $\beta$ forms, and 25–30% unchanged 1-methoxy-2-chloro-p-menthane.

EXAMPLE 12

200 grams of 1-methoxy-2-chloro-p-menthane, 100 grams of diethylene glycol and 100 grams of NaOH were stirred for 6 hours at 195–205° C. The reaction product was then distilled from the reaction flask to a pot temperature of 240° C. at atmospheric pressure. 153 grams of distillate was recovered. Infrared spectroanalysis of the distillate indicated that it contained 5–8% hydrocarbons, 50–45% 1-methoxy-2-p-methene, mixture of $\alpha$ and $\beta$ forms, 45–50% unchanged 1-methoxy-2-chloro-p-menthane.

EXAMPLE 13

300 grams of the crude chlorination product from Example 2, 75 grams of KOH and 75 grams of diethylene glycol were stirred for 4 hours at 195–205° C. The reaction product was then distilled from the reaction vessel to a pot temperature of 230° C. and 246 grams of distillate was recovered. Fractionation of the distillate, followed by infrared spectroanalysis of the fractions, indicated that it was 40–45% hydrocarbons comprising cymene, menthane, $\alpha$-terpinene and phellandrenes, 38–42% 1-methoxy-2-p-menthene, 10–15% 6-methoxy-1-p-menthene and 2–4% unchanged 1-methoxy-2-chloro-p-menthane.

EXAMPLE 14

300 grams of a mixture of $\alpha$ and $\beta$ forms of 1-methoxy-2-chloro-8-p-menthene, 150 grams of diethylene glycol and 150 grams of KOH were stirred at 195–205° C. for 4 hours. The reaction product was then distilled from the reaction vessel to a pot temperature of 230° C. and 207 grams of distillate was recovered. Fractionation of the distillate, followed by infrared spectroanalysis of the fractions, indicated that it was 15–20% hydrocarbons, 70–75% 1-methoxy-2,8-p-menthadiene, B.P., 10 mm., 75–82° C., 3–5% 1-methoxy-2-chloro-8-p-menthene.

Identification of Compounds

Infrared spectroanalysis of the hydrocarbon fraction indicated that it was very pure cymene.

Infrared spectroanalysis of the fraction boiling at 75–82° C. at 10 mm. indicated that it was an ether containing a disubstituted terminal methylene group and a symmetrically disubstituted ethylenic double bond as shown by the presence of the characteristic ether, disubstituted terminal methylene and symmetrically disubstituted ethylenic band absorptions at $9.2\mu$, $11.3\mu$ and $13.7\mu$, respectively. The catalytic addition of one mole of hydrogen to this fraction at 20–25° C. in the presence of 0.2% by weight of $PtO_2$ under a hydrogen pressure of 40–60 p.s.i.g. gave a mixture of the $\alpha$ and $\beta$ forms of 1-methoxy-2-menthene as determined by infrared spectroanalysis. From the above data it is evident that the fraction boiling at 75–82° C. at 10 mm. pressure is a mixture of the two stereoisomeric forms of 1-methoxy-2,8-p-menthadiene.

EXAMPLE 15

300 grams of 2-methoxy-3-chloro-pinane, 150 grams of diethylene glycol and 150 grams of KOH were stirred at 195–205° C. for 4 hours. The reaction product was then steam distilled to yield 220 grams of distillate. Fractionation of the distillate, followed by infrared spectroanalysis of the fractions, indicated that the distillate was 8–10% hydrocarbons, 60–65% 2-methoxy-3-pinene, B.P., 10 mm., 65–68° C., and 20–25% unchanged 2-methoxy-3-chloro-pinane.

Identification of Compounds

Infrared spectroanalysis of the hydrocarbon fraction indicated that it was a mixture of bicyclic compounds. The compounds were not identified.

Infrared spectroanalysis of the fraction boiling at 65–68° C. at 10 mm. pressure indicated that it was an unsaturated ether having a symmetrically disubstituted ethylenic bond, as shown by the presence of the characteristic ether and symmetrically disubstituted ethylenic bond absorptions at 9.2μ and 13.7μ, respectively. If the pinane skeleton has not rearranged during the dehydrochlorination, the double bond must be between carbon atoms 3 and 4. Oxidation of this fraction with $Na_2Cr_2O_7$ and aqueous $H_2SO_4$ at 20–25° C. gave verbenone, B.P., 10 mm., 96–98° C., as shown by comparison of the infrared spectrum of the oxidation product with the spectrum of a known sample of verbenone. From the above data, it is evident that the fraction boiling at 65–68° C. at 10 mm. is 2-methoxy-3-pinene.

EXAMPLE 16

200 grams of crude 1-methoxy-2-chloro-p-menthane-8-ol, as prepared in Example 7, 100 grams of diethylene glycol and 100 grams of KOH were stirred at 195–205° C. for 4 hours. The reaction product was then steam distilled to yield 121 grams of distillate. Fractionation of the distillate, followed by infrared spectroanalysis of the fractions, indicated that the distillate was 3–5% hydrocarbons, 35–40% 1-methoxy-2-menthene-8-ol, B.P., 10 mm., 118–120° C., and 50–55% of a compound that is believed to be 1-methoxy-2,8-epoxy-p-menthane, B.P., 10 mm., 103–105° C., $N_D^{25}$ 1.4765.

Identification of Compounds

The fraction boiling at 118–120° C. at 10 mm. was an unsaturated hydroxy ether having a symmetrically disubstituted ethylenic bond as shown by the presence of the characteristic hydroxyl, ether and symmetrically disubstituted ethylenic bond absorptions in the infrared spectrum at 3.0μ, 9.2μ and 13.7μ, respectively.

Infrared spectroanalysis of the compound boiling at 103–105° C. at 10 mm. pressure indicated that it was an epoxy-ether, as shown by the presence of the characteristic epoxy and ether absorptions at about 9.7μ and 9.2μ, respectively. The compound is believed to be 1-methoxy-2,8-epoxy-p-menthane.

EXAMPLE 17

300 grams of a mixture of the α and β forms of 1-methoxy-2-p-menthene, 300 grams of $Na_2Cr_2O_7$ and 1200 ml. of water were stirred at 20–25° C. while 2000 grams of 50% by weight aqueous $H_2SO_4$ was added slowly. An ice bath was required to hold the temperature below 25° C. After all of the $H_2SO_4$ solution had been added, the reaction mixture was stirred one hour at 20–25° C. The oil layer was then separated. The aqueous layer was extracted with ether and the ether extract was combined with the oil layer. The ether was removed to yield 106 grams of oxidation product. Fractionation of the oxidation product, followed by infrared spectroanalysis of the fractions, indicated that the oxidation product was 25–30% hydrocarbons and 65–70% piperitone, B.P., 10 mm., 102–103° C., and 7% residue. The structure of the piperitone was proved by comparing its infrared spectrum with the spectrum of a known sample of piperitone.

EXAMPLE 18

300 grams of 90% formic acid and 45 grams of anhydrous sodium acetate were mixed and precooled to 0–5° C. This mixture was added slowly to 300 grams of 1-methoxy-2-p-menthene at 0–5° C. with stirring. After two hours the stirring was stopped and the oil layer separated. Infrared spectroanalysis of the oil layer indicated that part of the 1-methoxy-2-p-menthene had been converted to an ester. The ester was saponified by stirring it with aqueous NaOH at 90–100° C. for 8 hours. The saponified oil, 250 grams, was then fractionated through an efficient column at 10 mm. pressure. Infrared spectroanalysis of the fractions indicated that the saponified oil contained 5–10% hydrocarbons (mixture of α-terpinene and phellandrenes), 55–60% unchanged 1-methoxy-2-p-menthene, 15–18% cis-piperitol and 15–18% trans-piperitol. The products were identified by comparing their infrared spectra with the spectra of the known compounds.

EXAMPLE 19

690 grams of a precooled formic acid-sodium acetate mixture, prepared in the proportions used in Example 18, was slowly added to 600 grams of dehydrochlorination product, prepared as shown in Example 13 and having the same composition. The reaction mixture was stirred for 2 hours at 0–5° C. The oil layer was then separated, saponified and fractionated as shown in Example 18. Infrared spectroanalysis of the fractions indicated that the saponified oil, 542 grams, was 45–50% hydrocarbons, 8–10% 1-methoxy-2-p-menthene, 10–12% 6-methoxy-1-p-menthene, and 25–30% piperitols composed of about equal parts of the cis and trans forms.

EXAMPLE 20

300 grams of 1-methoxy-2,8-p-menthadiene was agitated with an equal weight of a sodium acetate-formic acid mixture at 0–5° C. for two hours and treated as shown in the previous examples. The saponified oil, 257 grams, was fractionated and the fractions were analyzed by infrared spectroanalysis. The saponified oil consisted of 5–10% hydrocarbon, 50–60% unchanged 1-methoxy-2,8-p-menthadiene and 30–35% isopiperitenol. The catalytic addition of one mole of hydrogen to the isopiperitenol at a hydrogen pressure of 40–60 p.s.i.g. in the presence of 0.5% by weight of Raney nickel catalyst at 20–30° C. gave a mixture of cis and trans piperitols as determined by infrared spectroanalysis.

EXAMPLE 21

200 grams of 2-methoxy-3-pinene was treated with 230 grams of the sodium acetate-formic acid mixture by the procedure shown in Examples 18 and 19. The saponified oil obtained, 158 grams, was 30% trans-verbenol and 60–70% unchanged 2-methoxy-3-pinene as shown by infrared spectroanalysis.

EXAMPLE 22

A solution of 150 grams sodium acetate in 1000 grams of 85% formic acid was cooled to 0–5° C. and added to a mixture of the alpha and beta forms of 1-methoxy-2-p-menthene precooled to about the same temperature. The ether mixture had been prepared from d-limonene by the procedures disclosed herein, and it was accordingly optically active. After the mixture was stirred for two hours, the layers were allowed to separate and the upper oil phase subjected to a saponification. The saponified oil, 285 grams, was fractionated to yield 5–10% hydrocarbons, 55–60% unchanged 1-methoxy-2-p-menthene, 15–18% cis-piperitol and 15–18% trans-piperitol. The individual piperitols were purified by partial crystallization and centrifuging to yield piperitols having the following properties:

|  | Cis | Trans |
| --- | --- | --- |
| B.P., 10 mm. ° C. | 97.5 | 103 |
| $N_D^{25}$ | 1.4768 | 1.4766 |
| $D_4^{25}$ | 0.9212 | 0.9210 |
| $α_D^{25}$ (10 cm.) | +256 | −55.2 |
| M.P. ° C. | 30.8 | 4.8 |

100 grams of each of the purified piperitols was hydrogenated at 50–70° C. in the presence of 1.0% by weight of Raney nickel catalyst under a hydrogen pressure of 100–500 p.s.i.g. The hydrogenation product was filtered and fractionated. The fractions were analyzed by infrared spectroanalysis. The hydrogenation of the d-cis-piperitol gave a hydrogenation product that was 92–95% neomenthol, 5–7% other stereoisomers of menthol. Fractional distillation of the hydrogenation product gave high purity d-neomenthol, $\alpha_D^{25}$ +19.1°.

The hydrogenation of 1-trans-piperitol gave a hydrogenation product that was 95% isomenthol and 5% other stereoisomers of menthol as determined by infrared spectroanalysis. Fractional distillation of the hydrogenation product gave high purity 1-isomenthol, $\alpha_D^{25}$ −26.4°.

EXAMPLE 23

200 grams of cis-piperitol, $\alpha_D^{25}$ (10 cm.) +225°, was mixed at 0 to 5° C. with 460 grams of a mixture of 400 grams of 90% formic acid and 60 grams of sodium acetate. The materials gave a clear solution which became cloudy after 15 minutes. After one hour, an oil layer had separated. Saponification of the oil layer with an excess of a 25% solution of NaOH at 100° C. gave 189 grams of oils, $\alpha_D^{25}$ (10 cm.) +78°. Fractionation of the saponified oil through an efficient column followed by infrared spectroanalysis of the fraction showed that the saponfied oil yielded 3–5% hydrocarbons; 3–5% 2-p-menthene-1-ol, B.P., 10 mm., 85–90° C.; 45–50% cis-piperitol, $\alpha_D^{25}$ (10 cm.) +220°; and 40–45% trans-piperitol, $\alpha_D^{25}$ (10 cm.) −51°.

The fraction boiling at 85–90° C. at 10 mm. was an unsaturated tertiary alcohol having a symmetrically disubstituted ethylenic bond as shown by the presence of the characteristic tertiary alcohol and symmetrically disubstituted ethylenic bond absorption in the infrared spectrum at $9.3\mu$ and $13.7\mu$, respectively. Treatment of the tertiary alcohol mixture with a sodium acetate-formic acid mixture followed by saponification gave a mixture of piperitols as determined by infrared spectroanalysis.

EXAMPLE 24

200 grams of trans-piperitol, $\alpha_D^{25}$ (10 cm.) −51°, was treated with a mixture of 60 grams sodium acetate and 400 grams 90% formic acid at 9–5° C., and the ester which separated after standing one hour was saponified as shown in the previous example. Infrared spectroanalysis of the saponified oil, $\alpha_D^{25}$ (10 cm.) +75°, was 3–5% hydrocarbon, 3–5% 2-p-methene-1-ol, 45–55% cis-piperitol and 45–50% trans-piperitol.

EXAMPLE 25

500 grams of the filtered hydrogenation product from Example 1, 82–84% d-carvomenthene, 1500 grams of methanol and 315 grams of NaHCO$_3$ were stirred at 15–20° C. while 213 grams of chlorine was bubbled into the mixture. The methanol was then removed by distilling at atmospheric pressure to a pot temperature of 80° C. The methanol-free chlorination product was then filtered to remove inorganic salts. The filtered oil was then fractionated through an efficient column at 10 mm. pressure. Infrared spectroanalysis of the fractions indicated that the chlorination product was 20–25% hydrocarbons; 20–25% 6-methoxy-1-p-menthene; 3–5% 6-chloro-1-p-menthene; 48–52% 1-methoxy-2-chloro-p-menthane, a mixture of $\alpha$ and $\beta$ forms; and 3–5% higher boiling chlorides.

EXAMPLE 26

500 grams of 6-methoxy-1-p-menthene and 500 grams of 90% formic acid were heated at 50° C. for two hours. The reaction mixture was then diluted with water. The oil layer was saponified using an excess of an aqueous 25% NaOH solution at 100° C. The saponified oil, 433 grams, was fractionated through an efficient column at 10 mm. pressure. Infrared spectroanalysis of the fractions indicated that the saponified oil was 35–40% hydrocarbons, 5–10% unchanged 6-methoxy-1-p-menthene and 50–55% 1-p-menthene-6-ol, carvotanacetol, B.P., 10 mm., 102° C., $N_D^{25}$ 1.4790.

EXAMPLE 27

300 grams of trans-pipertol, $\alpha_D^{25}$ (10 cm.) −49°, was added slowly to a mixture of 600 grams of 90% formic acid and 90 grams of anhydrous sodium acetate at 0–5° C. The reaction mixture was stirred at 0.5° C. for one hour. The oil layer was then separated and washed with a NaHCO$_3$ solution to remove unreacted formic acid. The washed oil, 373 grams, was then fractionated through an efficient column at 10 mm. pressure to yield 5–10% hydrocarbons, 85–90% piperityl formate, mixture of cis and trans, B.P., 10 mm., 96–100° C., $N_D^{25}$ 1.4646, $D_4^{25}$ 0.9545, $\alpha_D^{25}$ (10 cm.) +36°, and 3–5% unchanged piperitols. Saponification of a portion of piperityl formate fraction gave a mixture of cis- and trans-piperitols.

EXAMPLE 28

200 grams of 1-cis-piperitol, $\alpha_D^{25}$ (10 cm.) −255°, is treated with 500 ml. glacial acetic acid at 10° C. The homogeneous solution is allowed to stand for 48 hours at 10 to 25° C., and then the excess acetic acid is removed by water wash. After neutralizing the oil layer by washing it with sodium bicarbonate solution, the ester is fractionated at 5 mm. pressure. After removal of a small amount of free alcohols, B.P. 70–85° C., containing some 2-menthene-1-ol, the pure piperityl acetate, B.P. 90–95° C. at 5 mm. distills. The ester shows $N_D^{25}$ 1.462, $D_4^{25}$ 0.950, $\alpha_D^{25}$ −31° (10 cm. tube). On saponification it yields a mixture of 1-cis and d-trans piperitols.

The foregoing examples are illustrative and many variations therein are possible. Other alkaline reagents can be used for the alkoxy chlorination step, or such reagents can be omitted entirely, although I prefer to employ a base. Any suitable base can be used for the dehydrochlorination step, but this is preferably a strong base, and organic bases, such as pyridine, collidine, etc., can be used, as well as the inorganic bases. Also other alcohols can be used, particularly the lower alcohols, such as ethyl, propyl, etc. for the alkoxy chlorination, but it will be found that the yield of the desired alkoxy compound will be appreciably less and I therefore prefer to employ methanol. Due to its cheapness, availability and suitability, methyl alcohol will ordinarily be preferred.

The pyrolysis of the verbenol and the isopiperitenol described herein is described and claimed in the copending application of Bain et al., Serial No. 348,825, filed April 14, 1953, now Patent 2,972,632, and the use of formic acid and other carboxylic acids for the conversion of the tertiary allyl alcohol ethers to the secondary allyl alcohol formates is described and claimed in the copending application of Bain, Serial No. 533,234, filed September 7, 1955, now Patent 2,935,526. Thus, while the invention has been illustrated with formic acid and its use is preferred, other carboxylic acids can be used.

It will also be appreciated that other terpenes possessing the same structure as that common to $\alpha$-pinene and carvomenthene can be employed for the chloro alkoxylation treatment, such as 3-thujene and 3-carene.

In conducting the chloralkoxylation, the terpenic compound and the lower alcohol, such as methanol, are mixed and preferably agitated as chlorine is fed into the mixture. The proportions of the ingredients are not critical, but we prefer to employ a several-mole excess of the alcohol and to employ about one mole of chlorine per mole of terpenic compound. While it is not necessary to employ a base to absorb the by-product hydrogen chloride formed, I prefer to employ a base in quantity somewhat in excess of that required in order that the excess alcohol can be recovered more or less acid-free and to improve the yield of chloralkoxy compound. The reaction proceeds exothermically, but smoothly. The temperature is not critical, but I find temperatures of 20° to 80° convenient and easy to maintain by cooling. Further, quite low temperatures, say 10° C. and below, favor formation of undesirable dichlorides, whereas temperatures above 80° C. tend to favor formation of allylic chloride at the expense of desired chloralkoxy compound.

The reaction is substantially complete as soon as all the chlorine has been added, and the product can be worked up immediately.

In working up the product, I can add water and separate the organic chloride layer from the aqueous layer and then distill or otherwise treat the organic chlorides. However, I find it convenient to simply distill the relatively low boling excess alcohol away from the organic chlorides and recover it for reuse. If a base is employed during the chloralkoxylation, the product can be filtered to remove inorganic salts prior or subsequent to the distillation of alcohol.

As shown in the examples, the chloralkoxylation is generally accompanied by some allylic chlorination and some formation of dichlorides. Thus, some 6-chloro-1-p-menthene, carvotanacetyl chloride, may be formed when carvomenthene is chloralkoxylated, and some 1,2-dichloro-p-menthene may be present in the reacted product. Further, the allylic chloride will tend to react more or less with the alcohol employed to form the ether. Thus, when carvomenthene is chloromethoxylated, more or less carvotanacetyl methyl ether is produced through reaction of carvotanacetyl chloride with the methanol. If the chlormethoxylation takes place in the presence of a base such as sodium bicarbonate and the excess methanol is distilled off at the end of the reaction, little carvotanacetyl chloride will be found since most of it will be converted to carvotanacetyl methyl ether. On the other hand, if the chloralkoxylation is conducted at low temperature and the methanol is wished out of the reaction product prior to heating the product, then a considerable amount of the carvotanacetyl chloride originally formed remains as such and less ether is formed.

Carvotanacetyl methyl ether can be used as a high boiling solvent or can be split to carvotanacetol and methanol by treatment with formic acid, followed by saponification of the esters formed. Carvotanacetyl chloride is readily converted to ethers by heating it with an alcohol, preferably in presence of a base. Alternatively, the chloride can be hydrolyzed to the alcohol easily by heating it with water and a base.

After its isolation the crude organic chloride-ether product can be fractionally distilled to isolate its individual components, or it can be employed directly for dehydrochlorination. Thus, the reaction product from chlorination of carvomenthene and methanol can be distilled to recover hydrocarbons, if any, carvotanacetyl methyl ether, carvotanacetyl chloride, if any, and the lower, alpha, and higher, beta, boiling forms of 1-methoxy-2-chloro-p-menthane, and finally the highest boiling fraction rich in 1,2-dichloro-p-menthane. The chloromethoxy compound, either or both forms, then readily yields 1-methoxy-2-menthene in readily purifiable form when subjected to dehydrochlorination.

Alternatively, the crude chlormethoxylated product can be dehydrochlorinated and then fractionated to obtain the desired 1-methoxy-2-menthene, alpha and beta forms.

In conducting the dehydrochlorination, the alkoxychloride containing product is heated with a base capable of at least partially neutralizing the hydrogen chloride evolved through the thermal decomposition of the alkoxychloride. Various bases can be employed, of course, but a suitable and convenient base is potassium hydroxide-diethylene glycol mixture. Presence of alcohols such as glycols tends to solubilize the alkali and make it more readily available for reaction. The pure alkoxy chloride decomposes only slowly below about 175° C., and at high temperatures, say 250° C. or higher, the 1-alkoxy-2-menthene tends to decompose somewhat. The optimum temperature of dehydrochlorination is, therefore, within the range of 175° to 250° C., though temperatures outside this range are operable. I find it convenient and satisfactory to simply heat the alkoxychloride, pure or impure, with a base and under atmospheric pressure until the product begins to boil and to distill the product slowly as the dehydrochlorination progresses.

Impurities such as hydrocarbons and carvotanacetyl methyl ether, as well as the desired 1-methoxy-2-menthene, all boil below the boiling point of 1-methoxy-2-chloro-p-menthene, and therefore the reaction and distillation can be conducted with a column so as to distill off the chlorine-free products while condensing the chlorinated products and returning them to the reactor containing the base. In this way it is possible to recover a distillate containing a little chlorides or almost free of chlorides and in very good yield. Very little unreacted chlorides remain in the reactor with the base.

Alternatively, the reaction can be completed without distillation if desired, and either at atmospheric or super-atmospheric pressure, and at the end of the reaction the water-soluble glycol or inorganic chlorides can be removed by washing.

The substantially chloride-free unsaturated ethers can be fractionated to secure the pure alpha and beta forms of 1-methoxy-2-menthene or a mixture of these or the crude dehydrochlorination product can be treated to obtain piperityl esters, and on saponification the piperitols. If either of the pure forms or a mixture of the two forms of 1-methoxy-2-menthene is processed with the carboxylic acid, such as formic or acetic, and then the reaction product rich in esters is saponified, the product will generally consist of an easily separable mixture of hydrocarbons, formed by some dehydration of the piperitols, the piperitols and unchanged 1-methoxy-2-menthene(s). Similar processing of the crude dehydrochlorination mixture yields a somewhat more complex mixture, but satisfactory yields of piperitols are obtained. In general, treatment of the 1-methoxy-2-menthene-rich mixture, from the dehydrochlorination of the whole ether-chloride reaction product, with a carboxylic acid under optimum conditions for formation of piperityl esters will not affect the impurities, including the carvotanacetyl methyl ether. This latter ether can be split with organic acids, but not as readily as can the desired ether, the 1-methoxy-2-menthene. While the crude dehydrochlorination can be used as a source of piperitols, the piperitols so produced are somewhat more difficult to isolate pure, and I therefore prefer to utilize at least a partly purified 1-methoxy-2-menthene for conversion to piperitols.

Although it is possible to isolate the individual alpha and beta forms of 1-methoxy-2-chloro-p-menthane, I do not prefer to do so, but prefer to avoid the cost of separating them, since each form dehydrochlorinates to 1-methoxy-2-menthene, though at slightly different rates. Furthermore, while it is possible to separate the alpha and beta forms of 1-methoxy-2-menthene, I prefer to avoid this expense, as each individual form yields a mixture of the two piperitols on splitting with an organic acid followed by saponification. It will be clear from the foregoing and from the examples that up to the piperitol stage, it is unnecessary to isolate individual cis-trans forms of the itnermediate products whether optically active or racemic menthol is to be produced. Further, if racemic menthol is desired, an optically inactive starting material for chloralkoxylation can be chosen and either the cis or trans piperitol or a mixture of these is suited for subsequent hydrogenation and isomerization to secure racemic methol.

On the other hand, if optically active menthol is to be produced, an optically active starting material must be chosen for chloralkoxylation, and one of the piperitols produced will be convertible via its hydrogenation product to dextro rotatory menthol and the other to laevo rotatory menthol, and therefore the two piperitols isolated are not of the same optical family. Therefore, the piperitols or their hydrogenation products, neomenthol and isomenthol, should be separated from each other prior to equilibration of the hydrogenated piperitols to produce optically active menthol if this scheme of conversion is to be utilized. Similar considerations apply to the conversion products of limonene, pinene, terpineol and other raw materials.

Having described the invention, what is claimed is:

1. The process which comprises treating a terpenic compound selected from the class consisting of α-pinene and unsaturated compounds of the p-menthane series having as the sole cyclic double bond a carbon-carbon double bond involving the cyclic carbon atom carrying the methyl group and possessing a cyclic methylenic carbon atom alpha to the cyclic double bond and beta with respect to the cyclic carbon atom carrying the methyl group with molecular chlorine in the presence of a low molecular weight alcohol until not more than about one mole of chlorine per mole of material being treated is reacted, treating the resulting chloroalkoxy compound with a strong base to remove the elements of HCl therefrom to form a tertiary allyl ether of the starting material.

2. The process of claim 1 in which the terpenic starting material is carvomenthene and the alcohol is methyl alcohol.

3. The process which comprises treating a terpenic compound selected from the class consisting of α-pinene and unsaturated compounds of the p-menthane series having as the sole cyclic double bond a carbon-carbon double bond involving the cyclic carbon atom carrying the methyl group and possessing a cyclic methylenic carbon atom alpha to the cyclic double bond and beta with respect to the cyclic carbon atom carrying the methyl group with molecular chlorine in the presence of a low molecular weight alcohol until not more than about one mole of chlorine per mole of material being treated is reacted, treating the resulting chloroalkoxy compound with a strong base to remove the elements of HCl therefrom to form a tertiary allyl ether of the starting material, and reacting the resulting dehydrochlorinated material with carboxylic acid to form the 3-acyloxy analogue of the starting material.

4. The process of claim 3 in which the terpenic starting material is carvomenthene and the alcohol is methyl alcohol.

5. The lower aliphatic alcohol ethers of 2-p-menthene-1-ol.

6. 1-methoxy-2-p-menthene.

7. The lower aliphatic alcohol ethers of 2-chloro-p-menthane-1-ol.

8. 1-methoxy-2-chloro-p-menthane.

9. The lower aliphatic alcohol ethers of 2,8-p-menthadiene-1-ol.

10. 1-methoxy-2,8-p-menthadiene.

11. The lower aliphatic alcohol ethers of 2-chloro-8-p-menthene-1-ol.

12. 1-methoxy-2-chloro-8-p-menthene.

13. Compounds selected from the class consisting of 1-alkoxy-2-p-menthene, 1-alkoxy-2,8-p-menthadiene, 1-alkoxy-2-p-menthene-8-ol, and 2-alkoxy-3-pinene, in which the alkoxy radical is the alkoxy radical of a lower aliphatic alcohol.

14. Compounds selected from the class consisting of 1-alkoxy-2-chloro-8-p-menthene, 1-alkoxy-2-chloro-p-menthane-8-ol and 2-alkoxy-3-chloro-pinane, in which the alkoxy radical is the alkoxy radical of a lower aliphatic alcohol.

References Cited in the file of this patent

UNITED STATES PATENTS

| 1,446,873 | Brooks | Feb. 27, 1923 |
| 2,360,898 | Sarbach | Oct. 24, 1944 |
| 2,361,532 | Cox | Oct. 31, 1944 |
| 2,424,960 | Bain et al. | Aug. 5, 1947 |

OTHER REFERENCES

Galloway et al.: Chem. Abstracts, vol. 31, (1937), col. 672 (1 page).

Irwin et al.: Jour. Amer. Chem. Soc., vol. 63 (1941), pages 858–860.

Simonsen: The Terpenes, 2nd ed., revised, vol. 1 pages 253, 269, 270, pub. by Cambridge Univ. Press (1953).

Summers: Chem. Rev., vol. 55 (1955), page 336.

UNITED STATES PATENT OFFICE
CERTIFICATE OF CORRECTION

April 3, 1962

Patent No. 3,028,418

Robert L. Webb

It is hereby certified that error appears in the above numbered patent requiring correction and that the said Letters Patent should read as corrected below.

Column 3, lines 25, 26, 28 and 41, for "di-", each occurrence, read -- d- --.

Signed and sealed this 24th day of July 1962.

(SEAL)
Attest:

ERNEST W. SWIDER
Attesting Officer

DAVID L. LADD
Commissioner of Patents